United States Patent
Ha et al.

(10) Patent No.: US 11,265,409 B2
(45) Date of Patent: Mar. 1, 2022

(54) COVER GLASS AND ELECTRONIC DEVICE COMPRISING SAME

(71) Applicant: Samsung Electronics Co., Ltd., Gyeonggi-do (KR)

(72) Inventors: Dohyung Ha, Gyeonggi-do (KR); Sungmin Shin, Gyeonggi-do (KR); Kisung Kim, Gyeonggi-do (KR); Minhoo Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 229 days.

(21) Appl. No.: 16/530,031

(22) Filed: Aug. 2, 2019

(65) Prior Publication Data

US 2020/0045155 A1 Feb. 6, 2020

(30) Foreign Application Priority Data

Aug. 2, 2018 (KR) .................. 10-2018-0090330

(51) Int. Cl.
*H04M 1/02* (2006.01)
*G02B 5/00* (2006.01)
*G02B 5/08* (2006.01)

(52) U.S. Cl.
CPC .......... *H04M 1/0283* (2013.01); *G02B 5/003* (2013.01); *G02B 5/0808* (2013.01)

(58) Field of Classification Search
CPC .. H04M 1/0283; H04M 1/0266; H04M 1/026; G02B 5/003; G02B 5/0808; G02F 1/133308; G02F 1/13332; G02F 1/133331; H01L 27/322
See application file for complete search history.

(56) References Cited

U.S. PATENT DOCUMENTS

| | | | | |
|---|---|---|---|---|
| 6,313,891 | B1 * | 11/2001 | Nagakubo ............ | G02B 6/0061 349/65 |
| 9,244,282 | B2 * | 1/2016 | Etienne .............. | G02B 27/0972 |
| 2015/0212244 | A1 * | 7/2015 | Kim ........................ | B32B 37/14 359/885 |

(Continued)

FOREIGN PATENT DOCUMENTS

| | | | | |
|---|---|---|---|---|
| EP | | 2993873 A1 * | 3/2016 | ........... G06F 1/1652 |
| EP | | 3 244 257 | 11/2017 | |

(Continued)

OTHER PUBLICATIONS

Machine Translation of KR 20160047418 (Year: 2016).*

(Continued)

*Primary Examiner* — Darryl J Collins
*Assistant Examiner* — Matthew Y Lee
(74) *Attorney, Agent, or Firm* — The Farrell Law Firm, P.C.

(57) ABSTRACT

A cover window is provided that includes a glass substrate, an optical pattern layer stacked on a first area and a second area of the glass substrate, the optical pattern layer having a plurality of patterns formed in the second area, a color layer stacked on the optical pattern layer having the plurality of patterns formed therein; and a mirror layer stacked on the color layer such that the mirror layer and the color layer are separated from each other, wherein in the second area of the glass substrate, natural light exhibits a color of the color layer due to an optical reaction between the color layer and the mirror layer.

20 Claims, 14 Drawing Sheets

(56) References Cited

U.S. PATENT DOCUMENTS

| | | | |
|---|---|---|---|
| 2016/0200247 A1 | 7/2016 | Krishna et al. | |
| 2017/0012235 A1* | 1/2017 | Kwon | H01L 51/5253 |
| 2017/0331071 A1 | 11/2017 | Han et al. | |
| 2018/0147810 A1 | 5/2018 | Cheon | |
| 2020/0031141 A1* | 1/2020 | Yoo | C09D 11/101 |

FOREIGN PATENT DOCUMENTS

| | | | |
|---|---|---|---|
| KR | 1020130037600 | 4/2013 | |
| KR | 20160047418 * | 5/2016 | |
| KR | 1020160047417 | 5/2016 | |
| KR | 1020160047418 | 5/2016 | |
| KR | 10-2016-0086773 | 7/2016 | |
| KR | 1020170088262 | 8/2017 | |
| KR | 101788596 B1 * | 10/2017 | G02B 5/223 |
| KR | 1020180061532 | 6/2018 | |

OTHER PUBLICATIONS

Machine Translation of KR-101788596-B1 (Year: 2017).*
International Search Report dated Nov. 11, 2019 issued in counterpart application No. PCT/KR2019/009683, 7 pages.
European Search Report dated May 3, 2021 issued in counterpart application No. 19843449.0-1216, 8 pages.

* cited by examiner

COVER GLASS AND ELECTRONIC DEVICE COMPRISING SAME

CROSS-REFERENCE TO RELATED APPLICATION(S)

This application is based on and claims priority under 35 U.S.C. § 119 to Korean Patent Application No. 10-2018-0090330, filed on Aug. 2, 2018, in the Korean Intellectual Property Office, the disclosure of which is incorporated by reference herein in its entirety.

BACKGROUND

1. Field

The disclosure generally relates to a cover glass and an electronic device including the same, and more particularly, to a self-luminous cover glass and an electronic device including the same.

2. Description of Related Art

Distinguishing features of hardware and software from electronic device manufacturers have gradually become insignificant, causing interest to grow in improving the performance of electronic devices, as well as improving aesthetically pleasing appearances of electronic devices and differentiating electronic devices in terms of design. As an example, the number of electronic devices employing a front display design that maximizes a display area is gradually increasing. An electronic device having a front display uses a cover window in order to protect the display surface. The cover window is made of a glass material due to the strong surface hardness and excellent optical performance thereof. However, limitations in design become apparent due to the characteristics of the glass material and the method of printing the front glass.

To implement a front-glass-type cover glass in an electronic device, it may be necessary to adopt a new form of design in order to satisfy users' desire for an aesthetically pleasing appearance and to achieve customization.

SUMMARY

The present disclosure has been made to address the above-mentioned problems and disadvantages, and to provide at least the advantages described below.

In accordance with an aspect of the present disclosure, a cover window includes a glass substrate, an optical pattern layer stacked on a first area and a second area of the glass substrate, the optical pattern layer having a plurality of patterns formed in the second area, a color layer stacked on the optical pattern layer having the plurality of patterns formed therein, and a mirror layer stacked on the color layer such that the mirror layer and the color layer are separated from each other, wherein in the second area of the glass substrate, natural light exhibits a color of the color layer due to an optical reaction between the color layer and the mirror layer.

In accordance with another aspect of the present disclosure, a cover window includes a glass substrate, an optical pattern layer stacked on a first area and a second area of the glass substrate and having a plurality of patterns formed in the second area, a color layer stacked on the optical pattern layer having the plurality of patterns formed therein, and a mirror layer stacked on the color layer such that the mirror layer and the color layer are separated from each other and a display attached to the cover window in which the mirror layer is stacked, wherein in the second area, natural light exhibits a color of the color layer due to an optical reaction between the color layer and the mirror layer.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
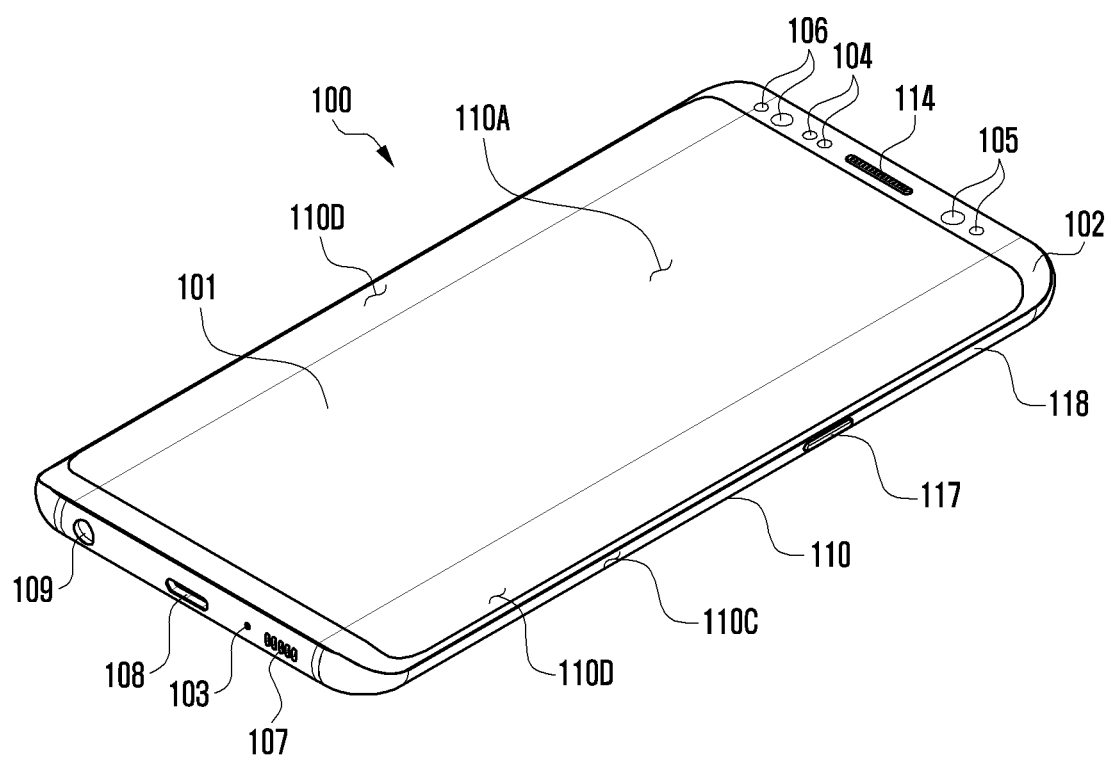
FIG. 1A is a perspective view of the front surface of a mobile electronic device, according to an embodiment.

A cover window and an electronic device may have a front plate or a rear plate, which is bent in a peripheral area or an edge area thereof. The cover window may be formed in a stacked structure in which a plurality of patterns are formed on an optical pattern layer from a curved point at which the glass substrate is bent toward an outside area, and the color layer and the mirror layer are stacked to be separated from each other such that the materials thereof are not mixed with each other. As a result, the color of the color layer may be exhibited in the presence of natural light without a separate light-emission unit.

Rather than artificially implementing a color, the cover window and the electronic device according to various embodiments may or may not exhibit the color corresponding to the color layer depending on the presence or absence of the color layer. Accordingly, it is possible not only to achieve a design differentiation effect of the electronic device, but it is also possible to create a design having an aesthetically pleasing appearance.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1A is a perspective view of the front surface of a mobile electronic device, according to an embodiment.

Figure 1B:
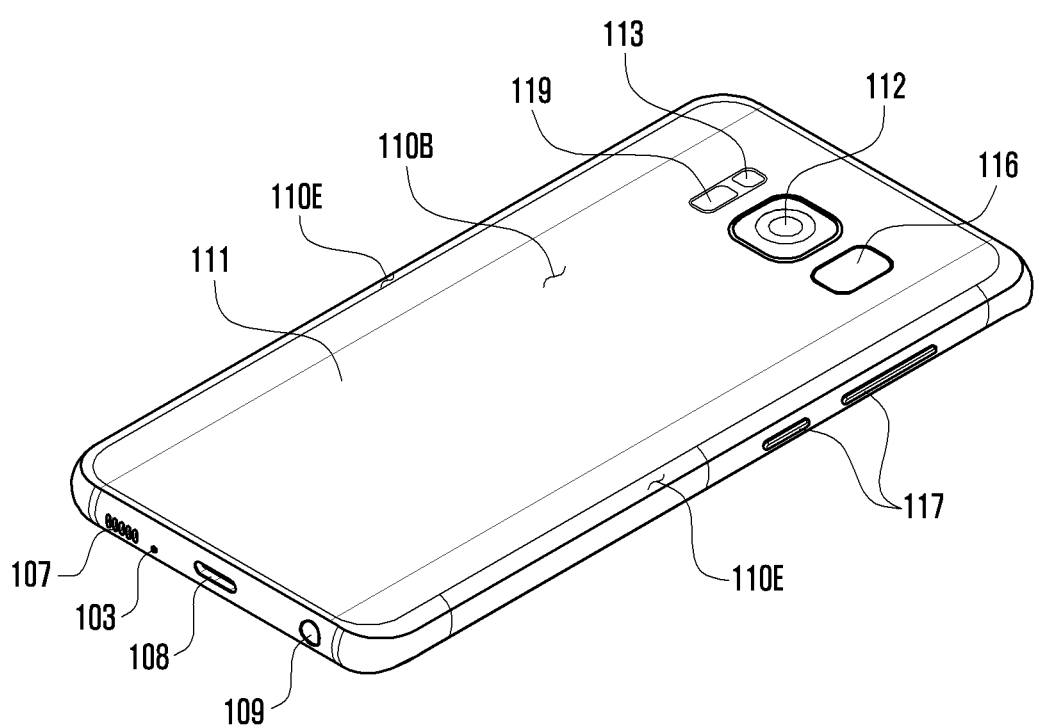
FIG. 1B is a perspective view of the rear surface of the electronic device of FIG. 1A, according to an embodiment.

FIG. 1B is a perspective view of the rear surface of the electronic device of FIG. 1A, according to an embodiment.

Referring to FIG. 1A and FIG. 1B, an electronic device 100 includes a housing 110 including a first surface (or front surface) 110A, a second surface (or rear surface) 110B, and a side surface 110C surrounding the space between the first surface 110A and the second surface 110B. The housing may denote a structure that forms a part of the first surface 110A, the second surface 110B, and the side surface 110C. The first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or side member) 118 which is coupled to the front plate 102 and to the rear plate 111, and which includes metal and/or polymer. The rear plate 111 and the side bezel structure 118 may be formed integrally and may include the same material (for example, a metal material such as aluminum).

The front plate 102 may include two first areas 110D on both ends of the long edge of the front plate 102 such that the two first areas 110D bend from the first surface 110A toward the rear plate 111 and extend seamlessly. The rear plate 111 may include two second areas 110E on both ends of the long edge such that the two second areas 110E bend from the second surface 110B toward the front plate 102 and extend seamlessly. The front plate 102 or the rear plate 111 may include only one of the first areas 110D or the second areas 110E. Alternatively, a part of the first areas 110D or the second areas 110E may not be included. When seen from the side surface of the electronic device 100, the side bezel structure 118 may have a first thickness (or width) on a part of the side surface, which does not include the first areas 110D or the second areas 110E as described above, and may have a second thickness that is smaller than the first thickness on a part of the side surface, which includes the first areas 110D or the second areas 110E.

The electronic device 100 may include at least one of a display 101, a first audio module 103, a second audio module 107, and a third audio module 114, a first sensor module 104, a second sensor module 116, and a third sensor module 119, a first camera module 105, a second camera module 112, and a third camera module 113, a key input device 117, a light-emitting element 106, and a first connector hole 108 and a second connector hole 109. At least one of the constituent elements (for example, the key input device 117 or the light-emitting element 106) of the electronic device 100 may be omitted, or the electronic device 100 may additionally include another constituent element.

The display 101 may be exposed through a corresponding part of the front plate 102. At least a part of the display 101 may be exposed through the front plate 102 that forms the first areas 110D of the side surface 110C and the first surface 110A. The display 101 may have a corner formed in substantially the same shape as that of the adjacent outer periphery of the front plate 102. In order to increase the area of exposure of the display 101, the interval between the outer periphery of the display 101 and the outer periphery of the front plate 102 may be formed to be substantially identical.

A recess or an opening may be formed in a part of the screen display area of the display 101, and at least one of a third audio module 114, a sensor module 104, a first camera module 105, and a light-emitting element 106 may be included and aligned with the recess or the opening. On the back surface of the screen display area of the display 101, at least one of a third audio module 114, a sensor module 104, a first camera module 105, a second sensor module 116 (e.g., a fingerprint sensor), and a light-emitting element 106 may be included. The display 101 may be coupled to or arranged adjacent to a touch sensing circuit, a pressure sensor capable of measuring the intensity (pressure) of a touch, and/or a digitizer that detects a magnetic field-type stylus pen. At least a part of the first sensor module 104 and the second sensor module 116 and/or at least a part of the key input device 117 may be arranged in the first areas 110D and/or the second areas 110E.

The first audio module 103 may include a microphone hole, the second audio module 107 may include a first speaker hole, and the third audio module 114 may include a second speaker hole. A microphone for acquiring an external sound may be arranged in the first audio module 103, and a plurality of microphones may be arranged therein such that the direction of a sound can be sensed. The first speaker hole (i.e., an outer speaker hole) and the second speaker hole (i.e., a speech receiver hole). The first speaker hole and the second speaker hole and the microphone hole may be implemented as a single hole, or a speaker may be included (for example, a piezoelectric speaker) without the first speaker hole and the second speaker hole.

The first sensor module 104, the second sensor module 116, and the third sensor module 119 may generate an electric signal or a data value corresponding to the internal operating condition of the electronic device 100 or the external environment condition thereof. The first sensor module 104, the second sensor module 116, and the third sensor module 119 may include, for example, a proximity sensor (i.e., the first sensor module 104) arranged on the first surface 110A of the housing 110, and/or a fingerprint sensor module (i.e., the second sensor module 116), and/or an HRM sensor (i.e., the third sensor module 119) arranged on the second surface 110B of the housing 110, and/or a fingerprint sensor (i.e., the second sensor module 116). The fingerprint sensor may be arranged not only on the first surface 110A (for example, a display) of the housing 110, but also on the second surface 110B thereof. The electronic device 100 may further include a sensor module, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor.

The first camera module 105 may include a first camera device arranged on the first surface 110A of the electronic device 100, the second camera module 112 may include a second camera device arranged on the second surface 110B, and the third camera module 113 may include a flash light. The first camera device and the second camera device may include a single lens or a plurality of lenses, an image sensor, and/or an image signal processor. The flash light may include, for example, a light-emitting diode or a xenon lamp. Two or more lenses (i.e., an infrared camera, a wide-angle lens, and a telephoto lens) and image sensors may be arranged on a single surface of the electronic device 100.

The key input device 117 may be arranged on the side surface 110C of the housing 110. The electronic device 100 may not include a part of or all of the above-mentioned key input device 117, which may be implemented in another type, such as a soft key, on the display 101. The key input device may include a second sensor module 116 arranged on the second surface 110B of the housing 110.

The light-emitting element 106 may be arranged on the first surface 110A of the housing 110. The light-emitting element 106 may provide information regarding the condition of the electronic device 100 in a light type. The light-emitting element 106 may provide a light source that interworks with some or all of the operations of the first camera module 105, for example. The light-emitting element 106 may include, for example, a light emitting diode (LED), an IR LED, and a xenon lamp.

The first connector hole 108 and the second connector hole 109 may include a first connector hole 108 capable of containing a connector (i.e., a USB connector) for transmitting/receiving power and/or data to/from an external electronic device, and/or a second connector hole (i.e., an earphone jack) 109 capable of containing a connector for transmitting/receiving an audio signal to/from the external electronic device.

A cover window comprises the optical pattern layer, the color layer, and the mirror layer. A bent area (e.g., the second areas 110D or 110E) of the cover window may exhibit, when natural light is present, the color of the color layer due to the optical action caused by the color layer and the mirror layer. The bent area may also exhibit, when no natural light is present, the black color since no colored light reflected by the mirror layer is present An electronic device according to various embodiments includes a cover window including a glass substrate, an optical pattern layer stacked on a first area and a second area of the glass substrate in which a plurality of patterns are formed, a color layer stacked on the optical pattern layer of the second area in which the a plurality of patterns are formed, and a mirror layer stacked on the color layer of the second layer such that the mirror layer and the color layer are separated from each other; and a display attached to the cover window in which the mirror is stacked, and in the second area, natural light is capable of exhibiting the color of the color layer due to an optical reaction between the color layer and the mirror layer.

The electronic device may further include a shield layer disposed between the mirror layer and the display.

The first area of a first face of the glass substrate, which is exposed to the outside, may be a planar area, the second area may be a bent area, at least a portion of which has a curved shape with reference to a curved point, the optical pattern layer may be a black layer, and each of the plurality of patterns may be implemented in the second area in a hole shape in which the black does not exist.

The color layer may be a translucent color layer printed using ink of a specific color, the mirror layer may be stacked after a drying process is performed such that the material of the color layer and the material of the mirror layer are not mixed with each other, and the mirror layer may have a mirror effect of 55% or more and may be formed of an opaque coating layer having low transmittance.

The color layer may be formed such that when natural light is present, the natural light is transmitted through the plurality of patterns of the optical pattern layer and is refracted and/or reflected by the mirror layer. The natural light may be held in the color layer by the optical reaction between the color layer and the mirror layer, and may exhibit the color of the color layer. When no natural light is present, the color layer exhibits a black color.

The second area may be a peripheral area, at least a portion of which overlaps a bezel area of the electronic device.

The color layer and the mirror layer are stacked only in the second area in which the display is not disposed.

The shape of a cover window included in a front plate will be described with reference to FIGS. 2A and 2B.

Figure 2A:
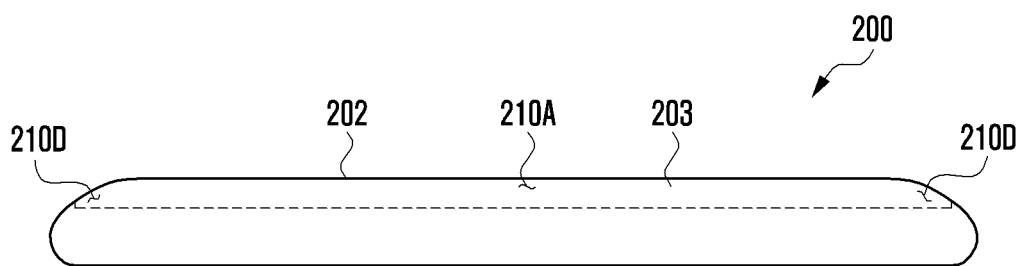
FIG. 2A illustrates a side face of an electronic device, according to an embodiment.

FIG. 2A illustrates a side face of an electronic device, according to an embodiment.

Figure 2B:
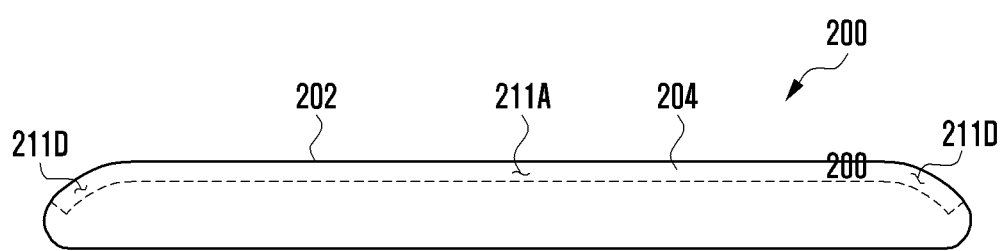
FIG. 2B illustrates a side face of an electronic device, according to an embodiment.

FIG. 2B illustrates a side face of an electronic device, according to an embodiment.

Referring to FIGS. 2A and 2B, an electronic device 200 may include a cover window 202 attached onto a display. Although FIGS. 2A and 2B show the front cover window 202, the rear plate 111 (i.e., a rear cover window) may be disposed on the rear face of the electronic device 200. When the rear cover window is disposed, the electronic device 200 may be implemented in a shape in which all of the peripheral or edge areas of the front face and the rear face have curved shapes.

A glass substrate 203 included in the cover window 202 may include a planar area 210A formed in a planar shape on the surface of the display 101, as well as bent areas 210D seamlessly connected to the planar area 210D.

The bent areas 210A of the glass substrate 203 may be formed as edges at opposite ends on both the left and right sides of the electronic device (e.g., in the X-axis direction or the Y-axis direction of the electronic device), or as a periphery surrounding the planar area 210A in the up-and-down and right-and-left directions of the planar area 210A (e.g., in the X-axis and Y-axis directions, or vertical and horizontal directions of the electronic device). The bent areas 210D of the glass substrate 203 may be processed to have a curved shape having a predetermined curvature. The bent areas may be formed to have a linear cut shape or a combination of a linear shape and a curved shape.

As illustrated in FIG. 2A, when the glass substrate 203 is divided into the planar area 210A and the bent areas 210D when viewed from a side of the electronic device 100, the upper faces of the left and right bent areas 210D may be formed in a curved shape starting from curved points, and the rear faces thereof may be formed in a planar shape (e.g., a two and a half dimensional (2.5D) type shape. When the glass substrate 203 is formed in the 2.5D type shape, since the rear faces of the bent areas 210D are formed in a planar shape in the electronic device 200, a planar display may be attached to the rear faces of the glass substrate 203. In the bent areas 210D of the glass substrate 203, an optical pattern layer, a color layer, and a mirror layer may be stacked in a state of being separated from each other. In FIG. 2A, since the rear faces of the bent areas 210D are formed in a planar shape, the optical pattern layer, the color layer, and the mirror layer, which are disposed on the rear faces of the glass substrate 203, may be stacked in a planar shape.

As illustrated in FIG. 2B, a glass substrate 202 including a planar area 211A and the bent areas 211D may be formed such that the upper faces in the bent areas 211D and the rear surfaces thereof are simultaneously bent starting from curved points (e.g., a 3D type shape). When the glass substrate 204 is formed in the 3D type shape, in the electronic device 200, the display may be attached in a curved shape in the bent areas 211D along the bent shape of the rear face of the glass substrate 204. Since the rear face of the glass substrate 204 in the case of FIG. 2B is bent in the bent areas 211D, the optical pattern layer, the color layer, and the mirror layer may also be stacked on the bent areas along the bent shape.

The display may be arranged to enable the input and output of data up to an area including at least a portion of each of the first planar area 210A or the second planar area 211A and the left and right bent areas 210D or 211D. The display may be implemented using any one of a liquid crystal display (LCD), an LED display, an organic LED (OLED) display, a micro-electro-mechanical system (MEMS) display, a flexible display, or an electronic paper display, but is not limited thereto. In FIG. 2B, the display may be formed of a flexible material.

The electronic device 200 may control the display to configure a screen only in the first planar area 210A or the second planner area 211A. The electronic device 202 may control the display to configure a screen including the first planar area 210A or the second planar area 211A and any one of the left and right bent areas 210D or 211D. The electronic device 200 may control the display to form a screen only on at least one of the left and right bent areas 210D or 211D, not including the planar areas 210A or 211A.

Figure 3:
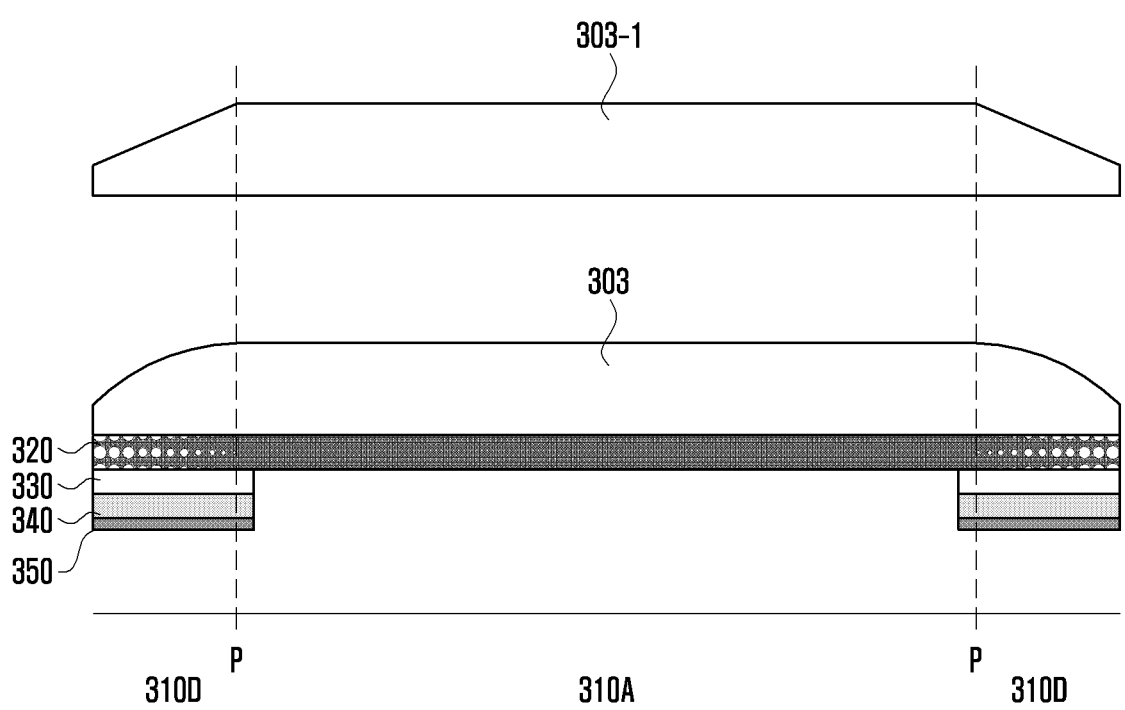
FIG. 3 illustrates a cross section of a cover glass, according to an embodiment.

FIG. 3 illustrates a cross section of a cover glass, according to an embodiment.

Referring to FIG. 3, a cover window may be fabricated using a silkscreen-printing method. The cover window may have a structure, in which an optical pattern layer 320, a color layer 330, a mirror layer 340, and a shielding layer 350 are stacked on the rear face of the glass substrate 303 including a planar area 310A and bent areas 310D. The optical pattern layer 320 is a layer in which a plurality of patterns are formed in the bent areas 310D starting from curved points P of the glass substrate 303. Additionally, the color layer 330, the mirror layer 340, and the shielding layer 350 may be stacked on the optical pattern layer 320 of the bent areas 310D.

The upper face of the glass substrate 303 may be exposed on the front face of the electronic device. In the glass substrate 303 including the planar area 310A and the bent areas 310D, the upper faces of the left and right partial bent areas 310D are formed as curved faces starting from the curved points P, and the rear faces of the left and right partial bent areas 310D are formed in a planar shape (e.g., a 2.5D type). For example, the upper face of the glass substrate 303 exposed to the outside may be shaped to have bent areas, which are at least partially bent by an extrusion operation of an upper mold. The shape of the bent areas 310D of the glass substrate 303 may be formed using various methods, such as an etching process, a polishing process, and a sandblasting process. A 2.5D-type glass substrate may have a curved shape in which the glass substrate is curved laterally in the bent areas 310D like the shape of the glass substrate 303, but a 2.5D-type glass substrate may be implemented in a straight shape like the shape of a glass substrate 303-1. The shape of the glass substrate of 303 or 303-1 may be applied to a 2.5D-type glass substrate at the time of manufacturing an electronic device.

The glass substrate 303 may be formed of a transparent glass material (e.g., a conductive glass such as sapphire glass, F-doped $SnO_2$ (FTO), or indium tin oxide (ITO), a transparent synthetic resin material, or a ceramic material.

The optical pattern layer 320 may be stacked and attached to the planar area 310A and the bent areas 310D of the rear surface of the glass substrate 303 in a planar shape. The optical pattern layer 320 may be a black pattern layer formed using a silkscreen-printing method. The optical pattern layer 320 may be black-coated on the planar area 310A, and a plurality of patterns may be printed on the bent areas 310D starting from one or more of the curved points P. The optical pattern layer 320 may serve to block components of the electronic device disposed under the cover window so as not to be visible from the outside. The plurality of patterns printed on the bent areas 310D may be printed using a silkscreen-printing method in the form in which the same a plurality of patterns are disposed or the plurality of patterns are increased or decreased in size. It can be understood that the plurality of patterns are in the form of a hole in which no black is printed. For example, as illustrated in FIG. 3, a plurality of patterns printed on the optical pattern layer 320 may constitute one or more patterns in which the size of dots gradually increases from one or more of the curve points P toward outside the electronic device. The shapes, sizes, arrangement intervals, or an increase/decrease of form in the size of the plurality of patterns in the bent areas 310D may be variously implemented depending on the silkscreen-printed design.

The color layer 330 may be stacked and attached to the optical pattern layer 320 in the bent areas 310D. The color layer 330 may be a translucent film layer having a specific color and stacked using a silkscreen-printing method. The color layer 330 may serve to emit light of a specific color due to an optical reaction between a natural light incident through the plurality of patterns implemented on the optical pattern layer 320 and light reflected by the mirror layer 340. The color layer 330 may be attached to the bent areas, but may also be attached to at least a portion of the planar area 310A starting from each of the curved points P.

The mirror layer 340 may be separately stacked on the optical pattern layer 320 formed in the bent areas 310D. The mirror layer 340 may be formed using a screen-printing method. The mirror layer 340 may have a mirror effect of at least 55% or more in order to enhance the mirror effect, and may be formed of an opaque coating layer of a metal material having low transmittance. The mirror layer 340 may serve to guide reflection or refraction of light such that the light is held in the color layer 330.

The mirror layer 340 may be stacked using a silkscreen-printing method after forming the color layer 330 using a silkscreen-printing method, and may be stacked after a drying process such that the material of the color layer 330 and the material of the mirror layer 340 are not mixed with each other.

The shielding layer 350 may be stacked on the mirror layer 340, which is stacked on the bent areas 310D. The shielding layer 350 may be a black layer, and may be formed using a silkscreen-printing method.

In the cover window, since the mirror layer 340 and the color layer 330 are stacked separate from each other rather than being mixed with each other, when natural light is present, the cover window is capable of generating an effect of causing the bent areas 310D to naturally emit light in the color of the color layer 330 due to the optical action caused by the optical pattern layer 320, the color layer 330, and the mirror layer 340. For example, since the natural light incident through the pattern of the optical pattern layer 320 is reflected by the mirror layer 340 and is reflected outside the electronic device through the optical pattern layer 320, the user recognizes the light as having the shape or pattern corresponding to the pattern formed in the bent areas 310D and having the color of the color layer 330. Since the planar area 310A of the optical pattern layer 320 is coated with a black color, the planar area 310A prevents the colored light reflected by the mirror 340 from passing therethrough. When natural light is not present, there is no light reflected by the mirror layer 340 after passing through the optical pattern layer 320. Therefore, the user recognizes not only the planar area 310A but also the bent areas 310D as having a black color.

Figure 4:
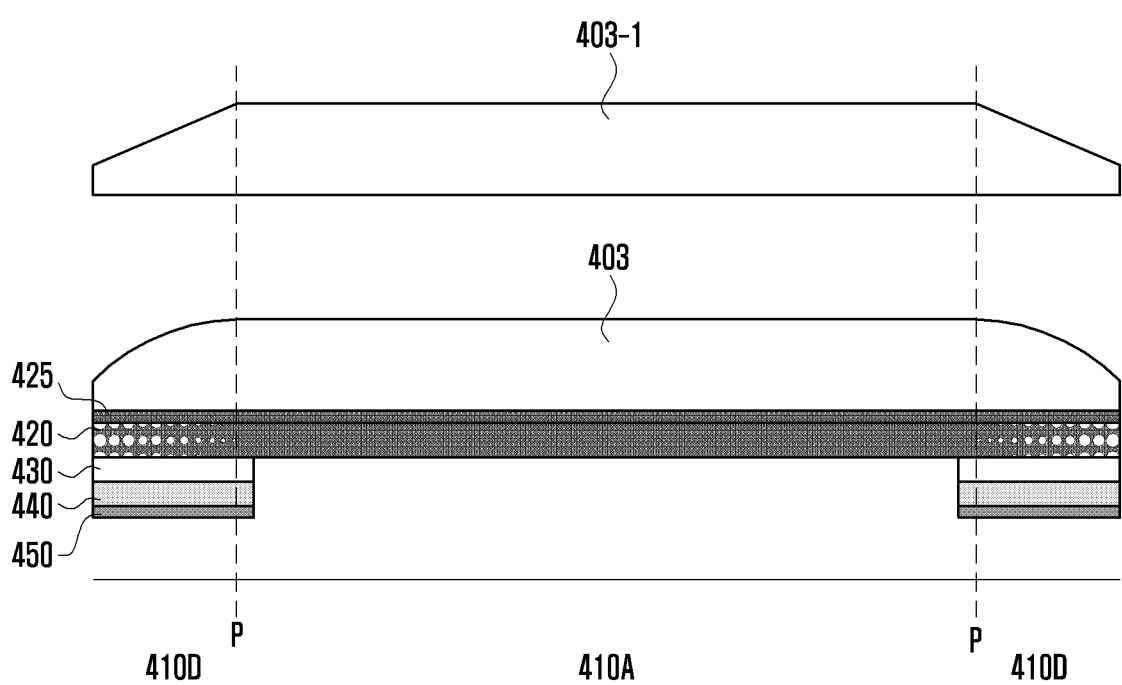
FIG. 4 illustrates a cross section of a cover glass, according to an embodiment.

FIG. 4 illustrates a cross section of a cover glass, according to an embodiment.

Referring to FIG. 4, a cover window may be fabricated using a silkscreen-printing method and/or a laser-engraving method. The cover window may have a structure in which an optical pattern layer 420, a color layer 430, a mirror layer 440, and a shielding layer 450 are stacked on the rear face of the glass substrate 403 including a planar area 410A and bent areas 410D. The cover window may further include the black layer 425, which is printed with black ink, between the optical pattern layer 420 and the glass substrate 403.

The glass substrate 403 may be a type in which the upper faces of left and right bent areas 410D starting from curved points P are formed as curved faces while the rear face thereof is formed as a planar face (e.g., a 2.5D type). However, besides the shape of the glass substrate 403, the glass substrate 403 may be implemented in a linear shape like the shape of glass substrate 403-1. The shape of the glass substrate 403 or 403-1 may be applied to a 2.5D-type glass substrate at the time of manufacturing an electronic device. The glass substrate 403 may be formed of a transparent glass material (e.g., conductive glass such as sapphire glass, FTO, or ITO, a transparent synthetic resin material, or a ceramic material.

On the optical pattern layer 420, a black layer 425 may be printed using black ink through a silkscreen-printing method, a black color or ink may be dually printed on the black layer 425, and then a plurality of patterns may be formed only in the bent areas 410D starting from the curved points P of the glass substrate 403 using a laser-engraving method. Each of the plurality of patterns formed in the bent areas 410D is in the form of a hole in which the black color or ink is not printed or from which the black color or ink is stripped. For example, the optical pattern layer 425 may be formed through ultrasonic cleaning and drying after the black films in the portion in which the plurality of patterns are to be formed using the laser-engraving method are stripped. When the laser-engraving method is used, it is possible to implement the optical pattern layer 420 which has improved pattern accuracy compared to the silkscreen-printing technique. The plurality of patterns formed in the optical pattern layer 420 may be formed in a type in which the sizes of the plurality of patterns gradually increase toward the outside starting from the curved points P at which the optical pattern layer 420 is transformed into the bent areas 410D. Additionally, the sizes, shapes, or arrangement intervals of a plurality of patterns may be variously set.

The color layer 430 may be stacked and attached to the optical pattern layer 420 in the bent areas 410D. The color layer 430 may be a translucent layer having a specific color and stacked using a silkscreen-printing method. The color layer 430 may serve to emit light of a specific color due to an optical reaction between natural light incident through the a plurality of patterns implemented on the optical pattern layer 420 and the black layer 425 and the light reflected by the mirror layer 440.

The mirror layer 440 may be separately stacked on the optical pattern layer 420 formed in the bent areas 410D. The mirror layer 440 may be formed using a screen-printing method. The mirror layer 440 may have a mirror effect of at least 55% or more in order to enhance the mirror effect, and may be formed of an opaque coating layer of a metal material having low transmittance. The mirror layer 440 may serve to guide reflection or refraction of light such that the light is held in the color layer 430. The mirror layer 440 may be formed using a silkscreen-printing method to form the color layer 430, and the mirror layer 440 may be stacked using a silkscreen-printing method after a drying process such that the material of the color layer 430 and the material of the mirror layer 440 are not mixed with each other.

The shielding layer 450 may be stacked on the mirror layer 440 stacked on the bent areas 410D. The shielding layer 450 may be a black layer, and may be formed using a silkscreen-printing method.

Figure 5:
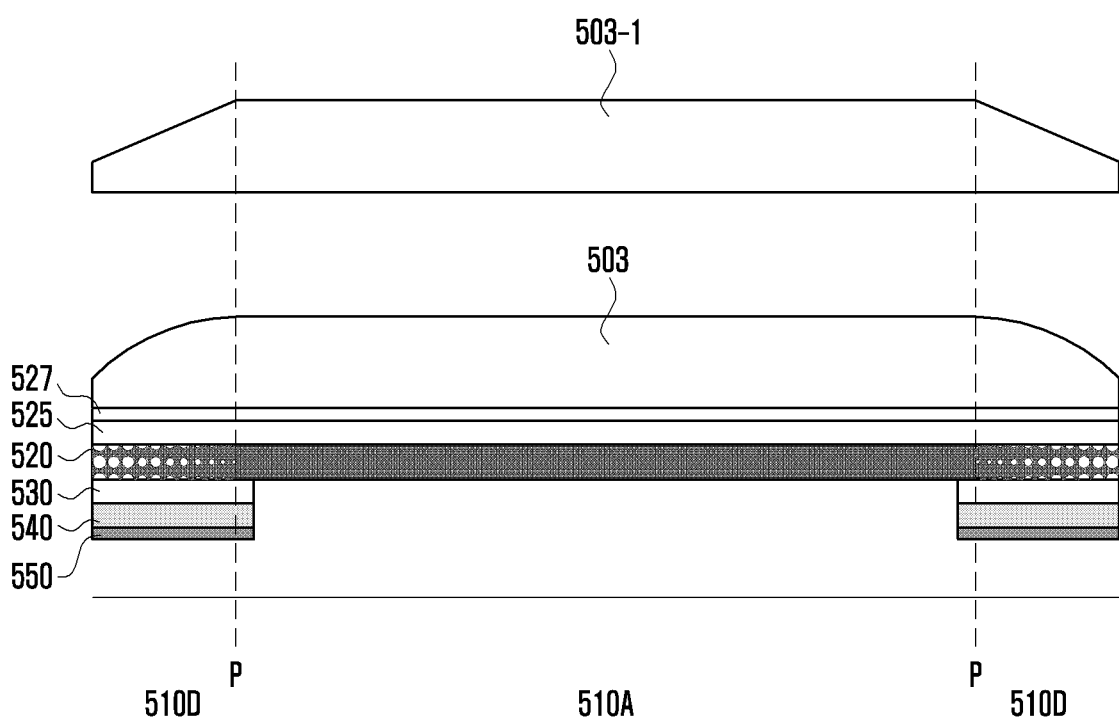
FIG. 5 illustrates a cross section of a cover glass, according to an embodiment.

FIG. 5 illustrates a cross section of a cover glass, according to an embodiment.

Referring to FIG. 5, a cover window may be fabricated using a film-laminating method. The cover window may have a structure in which an optical adhesive layer 527 and a light-transmissive protective layer 525 are stacked on the rear face of a glass substrate 503 including a planar area 510A and bent areas 510D, and an optical pattern layer 520, a color layer 530, and a mirror layer 540 are stacked on the protective layer 525 using the film-laminating method.

The upper face of the glass substrate 503 may be exposed on the front face of the electronic device. In the glass substrate 503 including the planar area 510A and the bent areas 510D, the upper faces of the left and right bent areas 510D are formed as curved faces starting from the curved points P, and the rear faces of the left and right partial bent areas 510D are formed in a planar shape (e.g., a 2.5D type). A 2.5D-type glass substrate may have a curved shape in which the glass substrate is curved laterally in the bent areas 510D like the shape of the glass substrate 503, but a 2.5D-type glass substrate may be implemented in a straight shape like the shape of the glass substrate 503-1. The shape of the glass substrate of 503 or 503-1 may be applied to a 2.5D-type glass substrate at the time of manufacturing an electronic device.

The optical adhesive layer 527 may be formed of an adhesive material of transparent double-sided tape-type optically clear adhesive (OCA) or a pressure-sensitive adhesive (PSA) on the planar area 510A and the bent areas 510D on the rear face of the glass substrate 503 in a planar shape. The protective layer 525 may be made of a light-transmissive polyethylene terephthalate (PET) material. The optical adhesive layer 527 and the protective layer 525 may serve to improve the optical effect of the optical pattern layer 520 and to bond the optical pattern layer 520 and the glass substrate 503 to each other.

The optical pattern layer 503 may be a black pattern layer formed using black ink through a silkscreen-printing method. The optical pattern layer 503 may be formed using a laser-engraving method after the silkscreen-printing using the black ink. Each of the a plurality of patterns of the optical pattern layer 520 may be implemented only in the bent areas 510D starting from the curved points P of the glass substrate 503 in the form of a hole in which no black is printed or from which the black is stripped. The shapes, sizes, arrangement intervals, an increase form in size, or a decrease form in size of the a plurality of patterns in the bent area 510D may be variously implemented depending on whether a silkscreen-printed design or a laser engraved design is implemented.

The color layer 530 may be stacked and attached to the optical pattern layer 520 in the bent areas 510D. The color layer 530 may be laminated with a coating effect, and may be a translucent layer having a specific color. The color layer 530 may serve to emit light in a specific color due to an optical reaction between natural light incident through the plurality of patterns implemented on the optical pattern layer 520 and light reflected by the mirror layer 540.

The mirror layer 540 may be separately stacked on the optical pattern layer 520 formed in the bent areas 510D. The mirror layer 540 may be formed of a laminated mirror having a coating effect. The mirror layer 540 may have a mirror effect of at least 55% or more in order to enhance the mirror effect, and may be formed of an opaque coating layer of a metal material having low transmittance. The mirror layer 540 may serve to guide reflection or refraction of light such that the light is held in the color layer 530.

Since the color layer 530 and the mirror layer 540 are formed using a laminating method so as to have a coating effect, the material of the color layer 530 and the material of the mirror layer 540 may be stacked in the state of being separated rather than being mixed with each other.

The shielding layer 550 may be stacked on the mirror layer 540 stacked on the bent areas 510D. The shielding layer 550 may be a black layer, and may be formed using a silkscreen-printing method.

Figure 6:
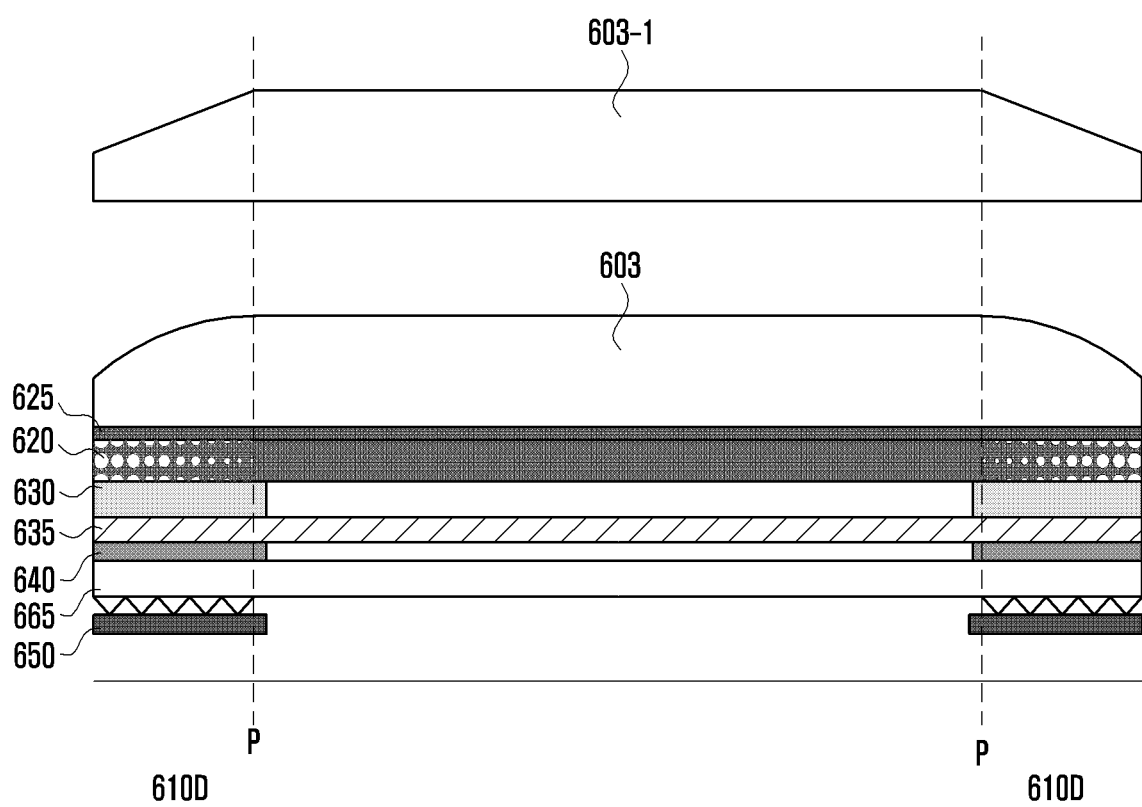
FIG. 6 illustrates a cross section of a cover glass, according to an embodiment.

FIG. 6 illustrates a cross section of a cover glass, according to an embodiment.

Referring to FIG. 6, a cover window may be fabricated using at least one of a silkscreen-printing method and a film-laminating method. A black layer 625 and an optical pattern layer 620 may be stacked on the rear face of a glass substrate 603 including a planar area 610A and bent areas 610D, and a color layer 630 may be stacked on the optical pattern layer 620 of the bent areas 610D starting from curved points P using a screen-printing method. An optical adhesive layer 635 may be stacked on the color layer 630. A mirror layer 640 may be stacked on the optical adhesive layer 635 of the optical pattern layer 620 in the bent areas 610D. The glass substrate 603 may have a structure in which a protective layer 665 is stacked on the mirror layer 640 using a film-laminating method and the shielding layer 650 is stacked using a screen-printing method.

The upper face of the glass substrate 603 may be exposed on the front face of the electronic device. In the glass substrate 603 including the planar area 610A and the bent areas 610D, the upper faces of the left and right partial bent areas 610D are formed as curved faces starting from the curved points P, and the rear faces of the left and right partial bent areas 610D are formed in a planar shape (e.g., a 2.5D type). A 2.5D-type glass substrate may have a curved shape in which the glass substrate is curved laterally in the bent areas 610D like the shape of the glass substrate 603. The 2.5D-type glass substrate may be implemented in a straight shape like that of a glass substrate 603-1. The shape of the glass substrate of 603 or 603-1 may be applied to a 2.5D-type glass substrate at the time of manufacturing an electronic device.

The black layer 625 may be a black-colored layer formed using black ink through a silkscreen-printing method. The optical pattern layer 620 may be a black pattern layer having a plurality of patterns formed only in the bent areas 610D starting from the curved points P of the glass substrate 603 using a laser-engraving method after the black layer is formed using black ink through a silkscreen-printing method. Each of the a plurality of patterns of the optical pattern layer 620 may be implemented in the form of a hole, in which no black is present or from which the black is stripped, only in the bent areas starting from the curved points of the glass substrate.

The color layer 630 may be stacked and attached to the optical pattern layer 620 in the bent areas 610D. The color layer 630 may be a translucent layer having a specific color and stacked using a silkscreen-printing method. The color layer 630 may serve to emit light of a specific color due to an optical reaction between natural light incident through the a plurality of patterns implemented on the optical pattern layer 620 and the black layer 625 and light reflected by the mirror layer 640.

The optical adhesive layer 635 may be formed of an adhesive material of transparent double-sided tape-type OCA or a PSA on the planar area 610A and the bent areas 610D in a planar shape. The optical adhesive layer 635 serves to increase the adhesive effect between the color layer 630 and the mirror layer 640 and to separate the material of the color layer 630 and the material of the mirror layer 640 from each other so they are not mixed with each other.

The mirror layer 640 may be deposited on the optical adhesive layer 635 in the bent area, and may be formed of a laminated mirror having a coating effect. The mirror layer 640 may have a mirror effect of at least 30% or more in order to enhance the mirror effect, and may be deposited with an opaque coating layer of a metal material having low transmittance. Deposition may be performed using at least one of sputtering and an E-beam process. The mirror layer 640 may serve to guide reflection or refraction of light such that the light is held in the color layer 630. The mirror layer 640 may be deposited by the optical adhesive layer 635 such that the material of the color layer 630 and the material of the mirror layer 640 are not mixed with each other.

The protective layer 665 may be formed of a PET material, and may be a layer cured by irradiating a mold in which a PET film is formed with high-intensity UV in order to increase the hardenability thereof.

The shielding layer 650 may be stacked on the mirror layer 640 stacked on the bent areas 610D. The shielding layer 650 may be a black layer, and may be formed using a silkscreen-printing method.

Figure 7A:
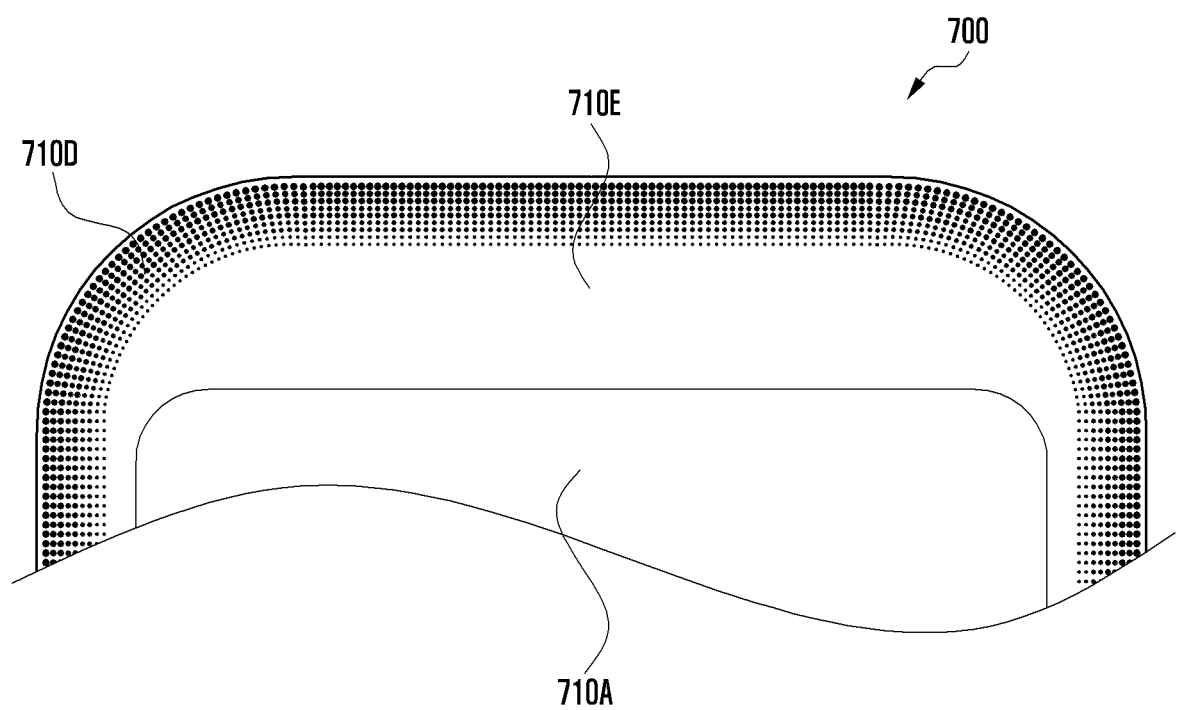
FIG. 7A represents a difference in optical effect of a cover window, according to an embodiment.

FIG. 7A represents a difference in the optical effect of a cover window, according to an embodiment.

Figure 7B:
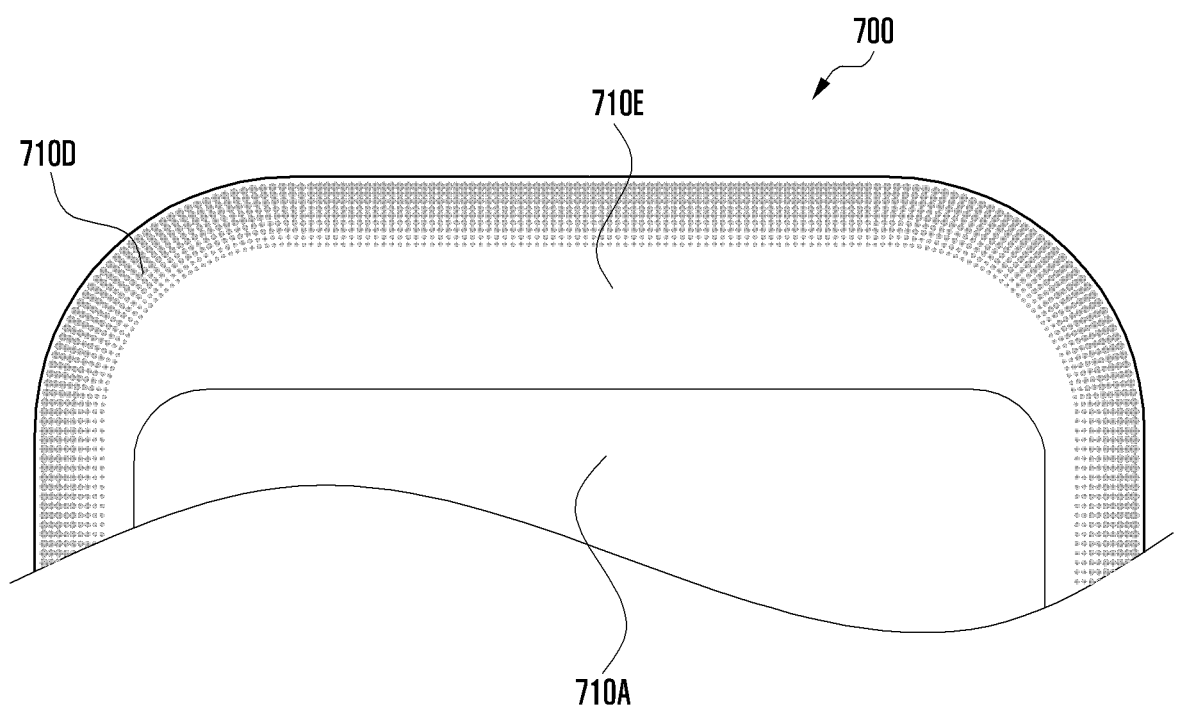
FIG. 7B represents a difference in optical effect of a cover window, according to an embodiment.

FIG. 7B represents a difference in the optical effect of a cover window, according to an embodiment.

Referring to FIGS. 7A and 7B, the cover window glass may have a structure in which an optical pattern layer, a color layer, a mirror layer, and a shielding layer separately stacked on the rear face of the substrate, and may or may not self-emit light in the bent areas of the electronic device, such as a peripheral area or an edge area.

The front face of the electronic device 700 may include a planar area 710A in which a cover window is disposed in a planar shape, and bent areas 710D seamlessly connected to the planar area 710A. The planar area 710A may be divided into a center portion in which a display for displaying information relating to driving (i.e. power management and/or distribution) of the electronic device 700 is displayed, and a bezel portion 710E in the periphery thereof. The cover window may overlap at least a portion of the bezel portion 710E to form bent areas 710D. Hereinafter, it is assumed that the bent areas 710D are in a peripheral area or an edge area.

As illustrated in FIG. 7A, when natural light is not present, the bent area 710D of the cover window may be exhibited as a black color. Since natural light is not present, there is no light passing through the plurality of patterns formed on the optical pattern layer and there is no optical effect whereby light is refracted or reflected by the mirror layer. Thus, no light is held in the color layer. As a result, when natural light is not present, in the cover glass, a peripheral area or bent areas 710D may be exhibited as the black color of the optical pattern layer. Although the shape of a plurality of patterns is clearly illustrated in the drawings, when the bezel portion is implemented in the black color, the peripheral area or bent areas do not exhibit the color of the color layer. Thus, the user may visually recognize the bezel portion as having a black color without pattern.

However, as illustrated in FIG. 7B, when natural light is present, the natural light is incident into the mirror layer through the plurality of patterns formed on the optical pattern layer of the cover window and is held in the color layer by the optical effect of the light refracted and reflected by the mirror layer, and light may exhibit the color of the color layer through the plurality of patterns. Although the plurality of patterns of the optical pattern layer are illustrated in the form in which the plurality of patterns are gradually enlarged as dots in the form of a gradation, the plurality of patterns of the optical pattern layer may be variously implemented depending on the design thereof. For example, when the color layer is implemented in a blue color, the peripheral area or the bent areas 710D of the cover window may exhibit the blue color in the form of dots as a plurality of patterns in the presence of natural light. Additionally or alternatively, when the color layer is implemented in a red color, the peripheral area or the bent areas 710D of the cover window may exhibit the red color in the presence of natural light.

The cover window included in the electronic device of the disclosure is capable of emitting light in the presence of natural light without a separate light-emitting unit by forming a plurality of patterns capable of transmitting light therethrough only in the bent areas 710D by bending the peripheral area or edge area starting from the curved points and forming a stacked structure in the bent areas 710D such that the materials of the color layer and the mirror layer are separated from each other rather than being mixed with each other. In addition, the electronic device is capable of exhibiting or not exhibiting a color corresponding to the color layer in a peripheral area or an edge area thereof depending on the presence or absence of natural light, rather than exhibiting a color irrespective of natural light by artificially implementing the color in the peripheral area or edge area.

As described above, the cover window implemented as the front plate may be formed in a stacked structure in which materials of the color layer and the mirror layer are separated from each other rather than being mixed with each other in an area in which the display is not disposed.

The shape of a cover window implemented with a rear plate irrespective of the disposal of a display will be described with reference to FIGS. 8 to 11.

Figure 8:
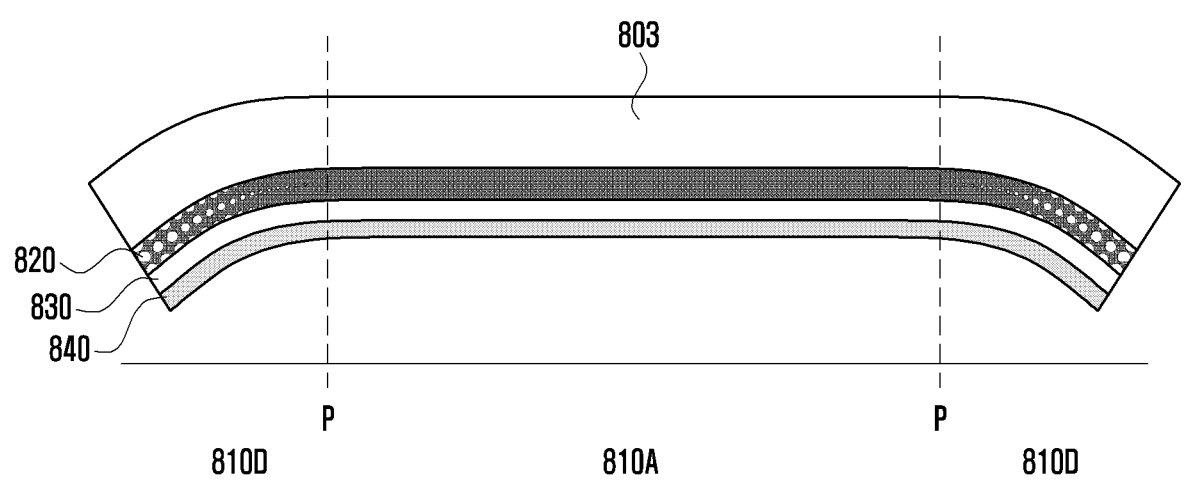
FIG. 8 illustrates a cross section of a cover glass, according to an embodiment.

FIG. 8 illustrates a cross section of a cover glass, according to an embodiment.

Referring to FIG. 8, a cover window of an electronic device may include a 3D-type substrate glass 803, which is divided into a planar area 810A and bent areas 810D, and in which the upper and rear faces of the bent areas 810D are both curved. The 3D-type substrate glass 803 may be disposed on the rear plate of the electronic device. The cover window may have a structure in which an optical pattern layer 820, a color layer 830, and a mirror layer 840 are stacked on a substrate glass 803 of a 3D-type substrate glass 803 using a silkscreen-printing method.

The upper face of the glass substrate 803 may be exposed on the rear face of the electronic device, and may be formed of a transparent glass material (e.g., conductive glass such as sapphire glass, FTO, or ITO), a transparent synthetic resin material, or a ceramic material. The glass substrate 803 may be formed of a transparent glass material (e.g., conductive glass such as sapphire glass, FTO, or ITO), a transparent synthetic resin material, or a ceramic material. The glass substrate 803 may be shaped to have bent areas 810D, which are at least partially bent on the upper face and the rear face thereof by an extrusion operation of an upper mold.

The optical pattern layer 820 may be stacked and attached to the planar area 810A and the bent areas 810D of the rear surface of the glass substrate 803 along the bent shape. The optical pattern layer 820 may be a black pattern layer formed using a silkscreen-printing method. The planar area 810A of the optical pattern layer 820 may be black-coated, and a plurality of patterns may be printed on the bent areas 810D starting from the curved points. The black area stacked on the planar area 810A may serve to block components of the electronic device disposed under the planar area 810A and inside the cover window so as not to be visible from the outside. Natural light may be incident on the color layer 830 and the mirror layer 840 through the plurality of patterns printed on the bent areas 810D.

The optical pattern layer 820 may be formed such that a plurality of patterns are arranged outwards from the curved points P or are arranged so as to be increasing or decreasing towards the outside, using the silkscreen-printing method. For example, each of the plurality of patterns in the bent areas 810D may be in the form of a hole in which the optical pattern layer 820 is not printed. The shapes, sizes, arrangement intervals, an increase form, or a decrease form in size of the plurality of patterns may be variously implemented depending on a screen-printed design.

The color layer 830 may be stacked and attached to the optical pattern layer 820 along the bent shape, and may be a translucent layer having any one specific color and stacked using a silkscreen-printing method. The color layer 830 may serve to emit light of a specific color due to an optical reaction between natural light incident through the plurality of patterns implemented on the optical pattern layer 820 and light reflected by the mirror layer 840.

The mirror layer 840 may be stacked on the color layer 830 along the bent shape such that the material of the color layer 830 and the material of the mirror layer 840 are separated from each other rather than being mixed with each other. The mirror layer 840 may have a mirror effect of at least 55% or more in order to enhance the mirror effect, and may be formed of an opaque coating layer of a metal material having low transmittance. The mirror layer 840 may serve to guide reflection or refraction of light such that the light is held in the color layer 830. The mirror layer 840 may be formed using a screen-printing method. In addition, the mirror layer 840 may be stacked using a printing method after the color layer 830 is formed, and after a drying process such that the material of the color layer 830 and the material of the mirror layer 840 are not mixed with each other.

Figure 9:
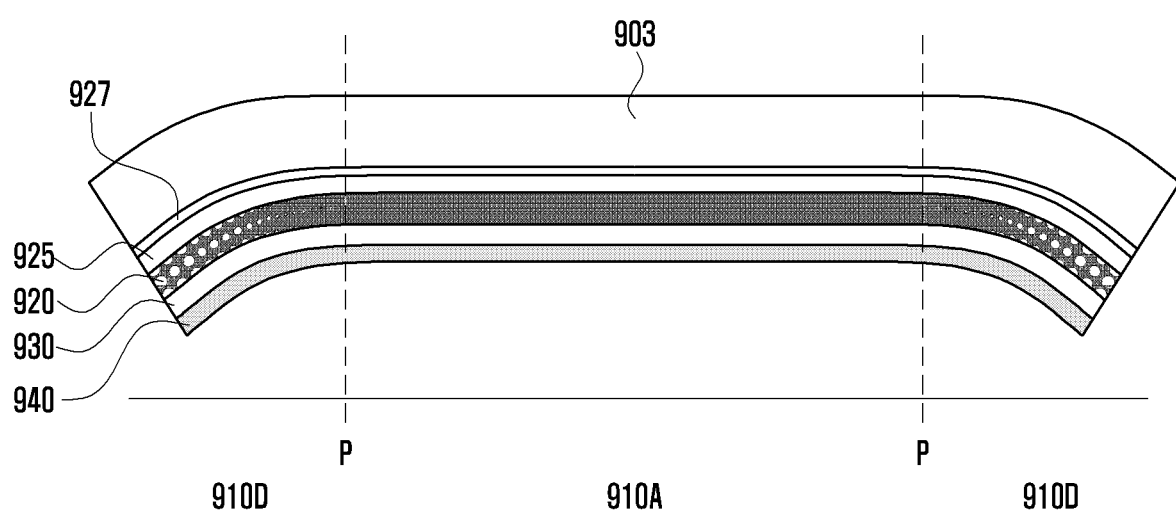
FIG. 9 illustrates a cross section of a cover glass, according to an embodiment.

FIG. 9 illustrates a cross section of a cover glass, according to an embodiment.

Referring to FIG. 9, a cover window of an electronic device includes a 3D-type substrate glass 903, which is divided into a planar area 910A and bent areas 910D, and in which the upper and rear faces of the bent areas 910D are both curved. The 3D-type substrate glass 903 may be disposed on the rear plate of the electronic device. The cover window may have a structure in which an optical adhesive layer 927 and a light-transmissive protective layer 925 are stacked on the rear face of the 3D-type glass substrate 903 along the bent shape, and an optical pattern layer 920, a color layer 930, and a mirror layer 940 are stacked on the protective layer 925 using the film-laminating method.

The upper face of the glass substrate 903 may be exposed on the rear face of the electronic device. Since the glass substrate 903 is bent in the bent areas not only in the upper face thereof but also in the rear face thereof, the optical pattern layer 920, the color layer 930, and the mirror layer 940 may be stacked in the bent shape along the shape of the glass substrate 903.

The optical adhesive layer 927 may be formed of an adhesive material of transparent double-sided tape-type OCA or PSA on the planar area 910A and the bent areas 910D on the rear face of the glass substrate 903 along the bent shape. The protective layer 925 may be made of a light-transmissive PET material. The optical adhesive layer 927 and the protective layer 925 may serve to improve the optical effect of the optical pattern layer 920 and to bond the optical pattern layer 920 and the glass substrate 903 to each other.

The optical pattern layer 920 may be stacked using at least one of a silkscreen-printing method using black ink and a laser-engraving method after silkscreen printing. Each of the plurality of patterns of the optical pattern layer 920 may be implemented in the form of a hole, in which no black is present or from which the black is stripped, only in the bent areas starting from the curved points of the glass substrate 903.

The color layer 930 may be stacked and attached along the bent shape of the optical pattern layer 920. The color layer 930 may be formed of a laminated mirror having a coating effect. The color layer 930 may serve to emit light of a specific color due to an optical reaction between natural light incident through the plurality of patterns implemented on the optical pattern layer and light reflected by the mirror layer.

The mirror layer 940 may be deposited on the color layer 930 and separated from the color layer 930 so as not to be mixed with the material of the color layer 930. The mirror layer 940 may be deposited on a laminated mirror film, may have a mirror effect of at least 55% or more in order to enhance the mirror effect, and may be deposited with an opaque coating layer of a metal material having low transmittance. The mirror layer 940 may serve to guide reflection or refraction of light such that the light is held in the color layer 930.

In the cover window, since the mirror layer 940 and the color layer 930 are stacked separate from each other rather than being mixed with each other, when natural light is present the cover window is capable of causing the bent areas 910D to exhibit the color of the color layer 930 due to the optical action caused by the optical pattern layer 920, the color layer 930, and the mirror layer 940. In contrast, when no natural is present, since the light passing through the optical pattern layer 920 and reflected by the mirror layer 940 is not present, the bent areas 910D of the cover window may exhibit the black color since no colored light reflected by the mirror layer is present.

Figure 10:
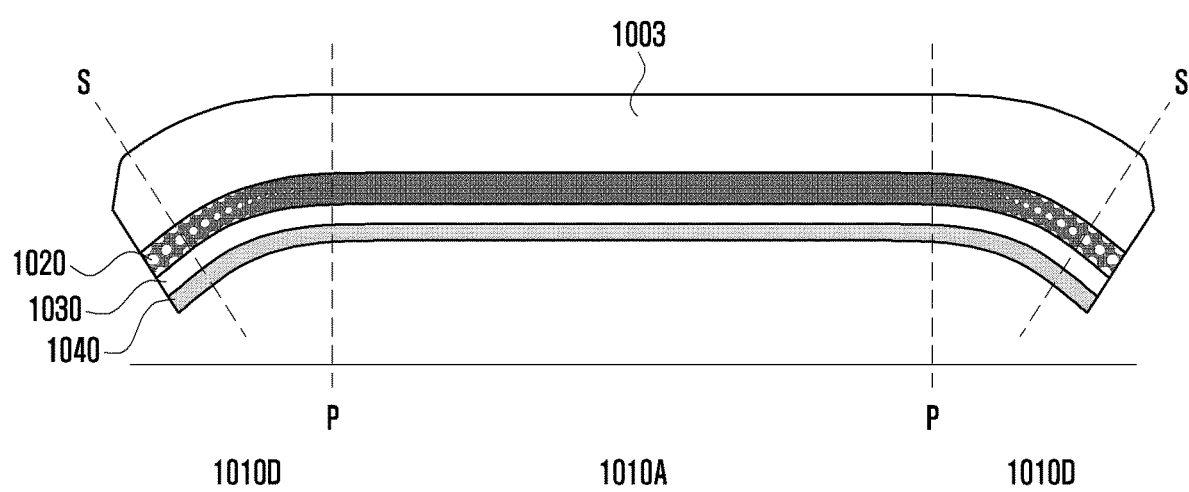
FIG. 10 illustrates a cross section of a cover glass, according to an embodiment.

FIG. 10 illustrates a cross section of a cover glass, according to an embodiment.

Referring to FIG. 10, a cover window of an electronic device includes a 3D-type substrate glass 1003, which is divided into a planar area 1010A and bent areas 1010D, and in which the upper and rear faces thereof are both curved, but at least a part of each of the bent areas of the upper face has a linear shape. The 3D-type substrate glass 1003, in which at least a part of each of the bent areas of the upper face has a linear shape, may be disposed on the rear plate of the electronic device. The cover window may have a structure in which an optical pattern layer 1020, a color layer 1030, and a mirror layer 1040 are stacked on a substrate glass 1003 of a 3D-type substrate glass 1003, in which at least a part of each of the bent areas of the upper face has a linear shape, using a silkscreen-printing method.

The upper face of the glass substrate 1003 may be exposed on the rear face of the electronic device. The glass substrate 1003 may be shaped such that at least a part of each of the upper and rear surfaces has a bent area through the extrusion operation of an upper mold, and may then be shaped to have a linear shape through an etching process, a polishing process, or a sandblasting process at starting points S. The glass substrate 1003 may be formed of a transparent glass material (e.g., conductive glass such as sapphire glass, FTO, or ITO), a transparent synthetic resin material, or a ceramic material. The bent areas 1010D of the glass substrate 1003 may be fabricated by combining a curved shape having a predetermined curvature and a linear shape in various forms.

The optical pattern layer 1020 may be stacked and attached to the planar area 1010A and the bent areas 1010D of the rear surface of the glass substrate 1003 along the bent shape. The optical pattern layer 1020 may serve to block components of the electronic device disposed under the cover window so as not to be visible from the outside.

The optical pattern layer 1020 may be a black pattern layer having a plurality of patterns formed in the bent areas 1010D from curved points P using a silkscreen-printing method. The planar area 1010A of the optical pattern layer 1020 may be black-coated, and a plurality of patterns may be printed on the bent areas 1010D starting from the curved points. For example, each of the plurality of patterns may be in the form of a hole in which the optical pattern layer 1020 is not printed. The shapes, sizes, arrangement intervals, an increase form in size, or a decrease form in size of the plurality of patterns may be variously implemented depending on a screen-printed design.

The color layer 1030 may be stacked and attached to the optical pattern layer 1020 along the bent shape, and may be a translucent layer having a specific color and stacked using a silkscreen-printing method. The color layer 1030 may serve to emit light of a specific color due to an optical reaction between natural light incident through the a plurality of patterns implemented on the optical pattern layer 1020 and light reflected by the mirror layer 1040.

The mirror layer 1040 may be stacked on the color layer 1030 along the bent shape such that the material of the color layer 1030 and the material of the mirror layer 1040 are separated from each other rather than being mixed with each other. The mirror layer 1040 may have a mirror effect of at least 55% or more in order to enhance the mirror effect, and may be formed of an opaque coating layer of a metal material having low transmittance. The mirror layer 1040 may serve to guide reflection or refraction of light such that the light is held in the color layer 1030. The mirror layer 1040 may be formed using a screen-printing method.

The mirror layer 1040 may be formed using a printing method after forming the color layer 1030 using a printing method, and after a drying process such that the material of the color layer 1030 and the material of the mirror layer 1040 are not mixed with each other. The mirror layer 1040 may be stacked using a printing method after the color layer 1030 is formed, and after a drying process such that the material of the color layer 1030 and the material of the mirror layer 1040 are not mixed with each other.

Figure 11:
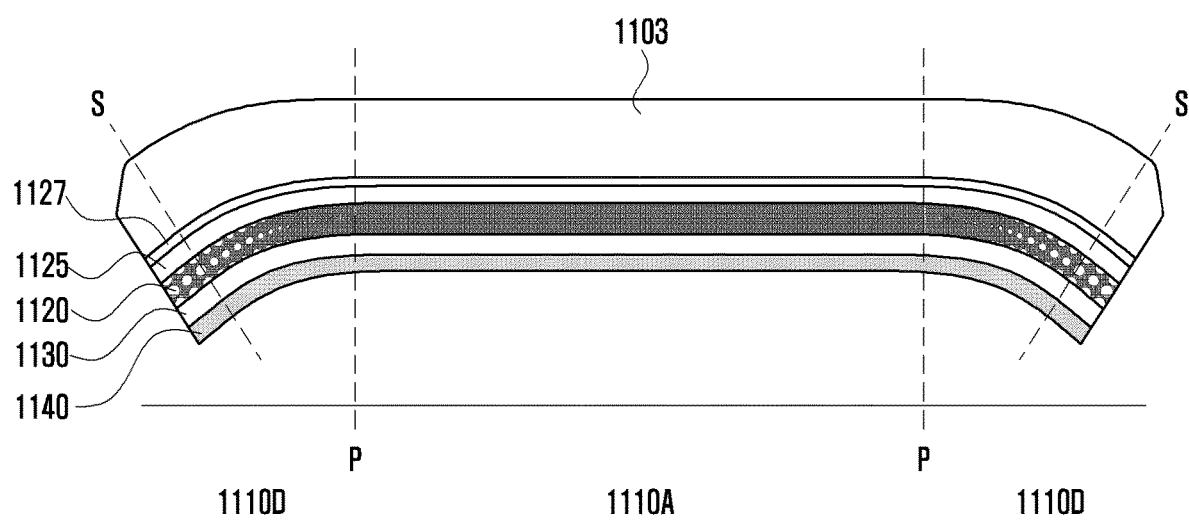
FIG. 11 illustrates a cross section of a cover glass, according to an embodiment.

FIG. 11 illustrates a cross section of a cover glass, according to an embodiment.

Referring to FIG. 11, a cover window of an electronic device includes a 3D-type substrate glass 1103, which is divided into a planar area 1110A and bent areas 1110D, and in which the upper and rear faces thereof are both curved but at least a part of each of the bent areas of the upper face has a linear shape.

The 3D-type substrate glass 1103, in which at least a part of each of the bent areas of the upper face has a linear shape, may be disposed on the rear plate of the electronic device. The glass substrate 1103 may be shaped such that at least a part of each of the upper and rear surfaces has a bent area through the extrusion operation of an upper mold, and may then be shaped to have a linear shape through an etching process, a polishing process, or a sandblasting process at starting points S.

Since the cover window is bent in the bent areas not only in the upper face thereof but also in the rear face thereof, an optical adhesive layer 1127, a light-transmissive protective layer 1125, an optical pattern layer 1120, a color layer 1130, and a mirror layer 1140 may be stacked in a bent shape along the bent shape of the glass substrate 1103. The optical pattern layer 1120 and the color layer 1130 may be stacked using a film-laminating method and the mirror layer 1140 may be deposited using a deposition method.

The optical adhesive layer 1127 may be formed of an adhesive material of transparent double-sided tape-type OCA or PSA on the planar area 1110A and the bent areas 1110D on the rear face of the glass substrate 1103 along the bent shape. The protective layer 1125 may be made of a PET material. The optical adhesive layer 1127 and the protective layer 1125 may serve to improve the optical effect of the optical pattern layer 1120 and to bond the optical pattern layer 1120 and the glass substrate 1103 to each other.

The optical pattern layer 1103 may be stacked using at least one of a silkscreen-printing method using black ink and a laser-engraving method after the silkscreen-printing. Each of the plurality of patterns of the optical pattern layer 1103 may be implemented in the form of a hole, in which no black is present, only in the bent areas starting from the curved points of the glass substrate.

The color layer 1130 may be stacked and attached along the bent shape of the optical pattern layer 1120. The color layer 1130 may be formed of a laminated mirror having a coating effect. The color layer 1130 may serve to emit light in a specific color due to an optical reaction between natural light incident through the plurality of patterns implemented on the optical pattern layer and light reflected by the mirror layer 1140.

The mirror layer 1140 may be deposited on the color layer 1130 so as to be separated therefrom rather than being mixed with the material of the color layer 1130. The mirror layer 1140 may be deposited with a laminated mirror having a coating effect. The mirror layer 1140 may have a mirror effect of at least 55% or more in order to enhance the mirror effect, and may be formed of an opaque coating layer of a metal material having low transmittance. The mirror layer 1140 may serve to guide reflection or refraction of light such that the light is held in the color layer.

The cover window is applicable to various shapes of glass substrates as described above, and may be implemented to generate an effect of exhibiting the color of the color layer in the bent areas when natural light is present by changing at least one of the sizes, shapes, or disposed intervals of the plurality of patterns formed on the optical pattern layer; the color density or transparency of the color layer; and the luminance component of the mirror layer in correspondence to the curved shape of the glass substrate exposed to the outside.

A cover window according to various embodiments may be included in at least one of the front face and the rear face of an electronic device. For example, in a cover window disposed on the front face, a color layer and a mirror layer may be disposed only in a peripheral area or edge area in addition to an area in which a display is disposed, and in the cover window disposed on the rear face, a color layer and a mirror layer may be disposed irrespective of whether the area is planar or bent. When natural light is present, due to the optical actions by an optical layer of the a plurality of patterns of an optical pattern layer, a color layer, and a mirror layer, which are disposed in the bent areas, the cover window is capable of generating an effect of exhibiting the color of the color layer. In contrast, when natural light is not present, since there is no light passing through the plurality of patterns of the optical pattern layer and reflected by the mirror layer, the bent areas in the cover window may be exhibited as a black color without exhibiting the color of the color layer.

A cover window according to various embodiments comprises a glass substrate, an optical pattern layer stacked on a first area and a second area of the glass substrate, the optical pattern layer having a plurality of patterns formed in the second area, a color layer stacked on the optical pattern layer having the plurality of patterns formed therein, and a mirror layer stacked on the color layer such that the mirror layer and the color layer are separated from each other, wherein, in the second area of the glass substrate, natural light exhibits a color of the color layer due to an optical reaction between the color layer and the mirror layer.

The optical pattern layer may be a black layer, and each of the plurality of patterns may be implemented in a form in which no black is present or from which a black color or ink is stripped.

The second area may be a bent area, at least a portion of which having a curved shape with reference to a curved point at which a curvature is generated, and the first area may be an area in which a display of an electronic device is disposed.

The color layer may be a translucent color layer printed through silkscreen-printing using ink of a specific color, and the mirror layer may be stacked after a drying process is performed such that a material of the color layer and a material of the mirror layer are not mixed with each other.

The mirror layer may have a mirror effect of 55% or more and may be formed of an opaque coating layer having low transmittance.

The color layer may be formed such that, when natural light is present, the natural light transmitted through the a plurality of patterns of the optical pattern layer is refracted and reflected by the mirror layer, and the natural light is held in the color layer and exhibits the color of the color layer due to an optical reaction between the color layer and the mirror layer, and when no natural light is present, the color layer exhibits a black color.

The optical pattern layer may be printed using black ink such that the first area includes black and the second area includes a plurality of patterns.

The optical pattern layer may be formed such that a first black film is printed in the first and second areas of the glass substrate using black ink, a second black film is printed on the first black film, and the plurality of patterns are formed in the second area through a laser-engraving method.

An optical adhesive layer and a light-transmissive protective layer may be stacked between the glass substrate and the optical pattern layer. The optical pattern layer and the protective layer may be stacked using a film-laminating method, and the mirror layer may be stacked using a deposition method.

The first area may be a peripheral area, at least a portion of which overlaps a bezel area of the electronic device. The glass substrate may be a substrate in which at least a portion of the first face in the second area is shaped in a curved shape or a linear shape facing toward a second face thereof. The optical pattern layer may be stacked opposite the first face and formed in a planar shape. The first face in the second area and the second face, which is opposite the first face, may both be shaped in a shape that is curved in one direction.

The color layer and the mirror layer may be disposed only in the second area.

At least one of sizes, shapes, or disposed intervals of the plurality of patterns formed in the optical pattern layer; a color density or transparency of the color layer; and a luminance component of the mirror layer may be changed according to (i.e., corresponding to) the shape of the glass substrate.

The plurality of patterns formed in the optical pattern layer may be formed such that sizes of the plurality of patterns gradually increase starting from a curved point, at which the optical pattern layer is transformed into the bent area, towards outside the cover window.

According to various embodiments, an electronic device comprises a cover window including a glass substrate, an optical pattern layer stacked on a first area and a second area of the glass substrate and having a plurality of patterns formed in the second area, a color layer stacked on the optical pattern layer having the plurality of patterns formed therein, and a mirror layer stacked on the color layer such that the mirror layer and the color layer are separated from each other. The electronic device may further include a display attached to the cover window in which the mirror layer is stacked, wherein, in the second area, natural light exhibits a color of the color layer due to an optical reaction between the color layer and the mirror layer.

A shielding layer may be disposed between the mirror layer and the display.

The first area may be a planar area, the second area may be a bent area, at least a portion of which has a curved shape with reference to a curved point, the optical pattern layer may be a black layer, and each of the plurality of patterns may be implemented in the second area in a hole shape in which the black layer does not exist.

The color layer may be a translucent color layer printed using ink of a specific color, the mirror layer may be stacked after a drying process is performed such that a material of the color layer and a material of the mirror layer are not mixed with each other. The mirror layer may have a mirror effect of 55% or more and may be formed of an opaque coating layer having low transmittance.

The color layer may be formed such that, when natural light is present, the natural light transmitted through the plurality of patterns of the optical pattern layer is refracted and reflected by the mirror layer, and the natural light may be held in the color layer and exhibit the color of the color layer due to an optical reaction between the color layer and the mirror layer. Additionally, when no natural light is present, the color layer may exhibit a black color.

The second area may be a peripheral area, at least a portion of which overlaps a bezel area of the electronic device. The color layer and the mirror layer may be stacked only in the second area in which the display is not disposed.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A cover window comprising:
a glass substrate;
a black pattern layer stacked on a first area and a second area of the glass substrate, the black pattern layer having a plurality of hole patterns formed in the second area;
a color layer; and
a mirror layer,
wherein the color layer is formed between the black pattern layer and the mirror layer such that a color of the color layer is exposed by reflection of natural light that is passing through the plurality of hole pattern.

2. The cover window of claim 1, wherein each of the hole patterns is implemented in a form in which no black ink is present or in a form in which black ink or black film is stripped.

3. The cover window of claim 2, wherein the second area is a bent area, at least a portion of which has a curved shape with reference to a curved point at which a curvature is generated, and the first area is an area in which a display of an electronic device is disposed.

4. The cover window of claim 3, wherein the color layer is a translucent color layer printed through silkscreen-printing using ink of a specific color, and the mirror layer is stacked after a drying process is performed such that a material of the color layer and a material of the mirror layer are not mixed with each other.

5. The cover window of claim 3, wherein the mirror layer has a mirror effect of 55% or more and is formed of an opaque coating layer having low transmittance.

6. The cover window of claim 3, wherein the glass substrate, when no natural light is present, exhibits a black color.

7. The cover window of claim 3, wherein the glass substrate is a substrate in which at least a portion of a first face in the second area is shaped in a curved shape or a linear shape toward a second face thereof and the black pattern layer stacked opposite the first face is formed in a planar shape, or
a substrate in which the first face in the second area and the second face, which is opposite the first face, are both shaped in a shape that is curved in one direction.

8. The cover window of claim 3, wherein at least one of the following is changed in correspondence to the shaped shape of the glass substrate:
sizes, shapes, or disposed intervals of the plurality of patterns formed in the black pattern layer;
a color density or transparency of the color layer; and
a luminance component of the mirror layer.

9. The cover window of claim 3, wherein the plurality of patterns formed in the black pattern layer are formed such that sizes of each of the plurality of patterns gradually increase starting from a curved point, at which the optical pattern layer is transformed into the bent area, toward an outside area.

10. The cover window of claim 2, wherein the black pattern layer is printed using black ink such that the first area includes black and the second area includes the plurality of hole patterns.

11. The cover window of claim 2, wherein the black pattern layer is formed such that, a first black film is printed in the first and second areas of the glass substrate using black ink, then a second black film is printed on the first black film and the plurality of patterns are formed in the second area through a laser-engraving method.

12. The cover window of claim 2, wherein an optical adhesive layer and a light-transmissive protective layer are further stacked between the glass substrate and the black pattern layer, and
the black pattern layer and the protective layer are stacked using a film-laminating method, and the mirror layer is stacked using a deposition method.

13. The cover window of claim 1, wherein the first area is a peripheral area, at least a portion of which overlaps a bezel area of an electronic device.

14. The cover window of claim 1, wherein the color layer and the mirror layer are disposed only in the second area.

15. An electronic device comprising:
a cover window including a glass substrate, a black pattern layer stacked on a first area and a second area of the glass substrate and having a plurality of hole patterns formed in the second area, a color layer, and a mirror layer; and
a display attached to the cover window in which the mirror layer is stacked,
wherein the color layer is formed between the black pattern layer and the mirror layer such that a color of the color layer is exposed by reflection of natural light that is passing through the plurality of hole patterns.

16. The electronic device of claim 15, further comprising:
a shielding layer disposed between the mirror layer and the display.

17. The electronic device of claim 15, wherein the first area is a planar area, the second area is a bent area, at least a portion of which has a curved shape with reference to a curved point, the black pattern layer is a black layer, and each of the plurality of patterns is implemented in the second area in a hole shape in which the black layer does not exist.

18. The electronic device of claim 15, wherein the color layer is a translucent color layer printed using ink of a specific color, the mirror layer is stacked after a drying process is performed such that a material of the color layer and a material of the mirror layer are not mixed with each other, and
the mirror layer has a mirror effect of 55% or more and is formed of an opaque coating layer having low transmittance.

19. The electronic device of claim 15, wherein the glass substrate, when no natural light is present, exhibits a black color.

20. The electronic device of claim 15, wherein the second area is a peripheral area, at least a portion of which overlaps a bezel area of the electronic device, and the color layer and the mirror layer are stacked only in the second area in which the display is not disposed.

* * * * *